US012555233B2

United States Patent
Hsu et al.

(10) Patent No.: US 12,555,233 B2
(45) Date of Patent: Feb. 17, 2026

(54) IMAGE REGISTRATION METHOD AND SYSTEM

(71) Applicant: INDUSTRIAL TECHNOLOGY RESEARCH INSTITUTE, Hsinchu (TW)

(72) Inventors: Po-An Hsu, New Taipei (TW); Wei-Zheng Lu, Chiayi (TW); Hansen Wijanarko, Hsinchu (TW); Hsiang-Wei Hu, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 294 days.

(21) Appl. No.: 18/399,163

(22) Filed: Dec. 28, 2023

(65) Prior Publication Data
US 2025/0217969 A1 Jul. 3, 2025

(51) Int. Cl.
*G06K 9/00* (2022.01)
*G06T 3/40* (2006.01)
(Continued)

(52) U.S. Cl.
CPC .............. *G06T 7/0012* (2013.01); *G06T 3/40* (2013.01); *G06T 7/10* (2017.01); *G06T 7/30* (2017.01);
(Continued)

(58) Field of Classification Search
CPC ... G06T 7/33; G06T 2207/20081; G06T 7/11; G06T 7/30; G06T 2207/10028;
(Continued)

(56) References Cited

U.S. PATENT DOCUMENTS

| | | | |
|---|---|---|---|
| 8,355,775 B2 * | 1/2013 | Oshiki | A61B 5/02007 600/407 |
| 9,165,362 B2 | 10/2015 | Siewerdsen et al. | |

(Continued)

FOREIGN PATENT DOCUMENTS

| | | |
|---|---|---|
| CN | 108806776 A | 11/2018 |
| CN | 113543695 A | 10/2021 |

(Continued)

OTHER PUBLICATIONS

TW Office Action dated Jul. 17, 2024 in application No. 112151193.
(Continued)

*Primary Examiner* — Alex Kok S Liew
(74) *Attorney, Agent, or Firm* — Maschoff Brennan (57) ABSTRACT

An image registration method is read by a processing device to perform: obtaining a first medical image and a second medical image generated by different imaging devices, with the first medical image including soft and hard tissue image; segmenting the first medical image and the second medical image to obtain a first hard tissue image and a second hard tissue image, respectively; aligning a coordinate axis of the first hard tissue image and a coordinate axis of the second hard tissue image, and obtaining a registration field indicating a corresponding relationship between the first hard tissue image and the second hard tissue image; obtaining a scale ratio between the first hard tissue image and the second hard tissue image according to the registration field; and generating a target soft and hard tissue image according to the scale ratio, the soft and hard tissue image and the second hard tissue image.

23 Claims, 7 Drawing Sheets

(51) Int. Cl.
*G06T 7/00* (2017.01)
*G06T 7/10* (2017.01)
*G06T 7/30* (2017.01)
*G06T 15/00* (2011.01)
*G06V 20/70* (2022.01)
*G16H 30/40* (2018.01)

(52) U.S. Cl.
CPC .............. *G06T 15/00* (2013.01); *G06V 20/70* (2022.01); *G16H 30/40* (2018.01); *G06T 2207/30012* (2013.01)

(58) Field of Classification Search
CPC . G06T 2207/10081; G06T 2207/20084; G06T 2207/30101; G06T 7/0012; G06T 2207/10076; G06T 2207/10088; G06T 2207/10104; G06T 2207/10108; G06T 2207/10132; G06T 2207/20212; G06T 2207/30004; G06T 2207/30012; G06T 2207/30016; G06T 2207/30081; G06T 7/0014; G06T 7/0016; G06T 11/00; G06T 15/00; G06T 19/006; G06T 19/20; G06T 2200/24; G06T 2207/10072; G06T 2207/20101; G06T 2207/30008; G06T 2207/30096; G06T 2207/30168; G06T 2210/41; G06T 2219/2016; G06T 3/40; G06T 5/92; G06T 7/10; G06T 7/38; G06T 7/73; G06T 7/97; G06V 20/70
See application file for complete search history.

(56) References Cited

U.S. PATENT DOCUMENTS

| | | | |
|---|---|---|---|
| 9,214,009 B2 | 12/2015 | Wan et al. | |
| 10,614,573 B2 | 4/2020 | Lin et al. | |
| 11,354,813 B2 | 6/2022 | Piat et al. | |
| 2012/0116219 A1* | 5/2012 | Miller | G01S 7/52042 600/438 |
| 2019/0105106 A1 | 4/2019 | Wentorf et al. | |
| 2019/0231433 A1* | 8/2019 | Amanatullah | A61B 17/1703 |
| 2019/0378274 A1 | 12/2019 | Garnavi et al. | |
| 2020/0051258 A1 | 2/2020 | Miao et al. | |
| 2023/0289984 A1* | 9/2023 | Reaungamornrat | G06T 7/33 |

FOREIGN PATENT DOCUMENTS

| | | |
|---|---|---|
| CN | 114187293 A | 3/2022 |
| CN | 110599528 B | 5/2022 |
| CN | 111862175 B | 9/2022 |
| CN | 116228823 A | 6/2023 |
| CN | 113096166 B | 8/2023 |

OTHER PUBLICATIONS

Yamanaka, Y. et al., "3-D MRI/CT fusion imaging of the lumbar spine," Skeletal Radiol, vol. 39, pp. 285-288 (2010).

Markelj, P. et al., "A review of 3D/2D registration methods for image-guided interventions," Medical Image Analysis, vol. 16, pp. 642-661 (2012).

Kamogawa, J. et al., "Virtual pathology of cervical radiculopathy based on 3D MR/CT fusion images: impingement, flattening or twisted condition of the compressed nerve root in three cases," SpringerPlus, vol. 4, 123, (2015).

Balakrishnan, G. et al., "An Unsupervised Learning Model for Deformable Medical Image Registration," IEEE/CVF Conference on Computer Vision and Pattern Recognition, pp. 9252-9260 (2018).

Hu, Y. et al., "Weakly-supervised convolutional neural networks for multimodal image registration," Medical Image Analysis, vol. 49, pp. 1-13 (2018).

Balakrishnan, G. et al., "VoxelMorph: A Learning Framework for Deformable Medical Image Registration," IEEE Transactions on Medical Imaging, vol. 38, Issue 8, pp. 1788-1800 (Aug. 2019).

Hirayama, J. et al., "Percutaneous Endoscopic Diskectomy using an Interlaminar Approach Based on 3D CT/ MR Fusion Imaging," J Neurol Surg A, vol. 80, pp. 88-95 (2019).

Kim, B. et al., "DiffuseMorph: Unsupervised Deformable Image Registration Using Diffusion Model," Computer Vision—ECCV 2022, pp. 347-364 (2022).

Ertilav, E. et al., "Facet Median Branch Radiofrequency Thermocoagulation Treatment at Different Temperatures and Durations in Patients with Lumbar Facet Syndrome: A Randomized Controlled Double-Blind Study," Turk Neurosurg, vol. 32, Issue 1, pp. 149-154 (2022).

Chen, Z. et al., "Unsupervised Multi-Modal Medical Image Registration via Discriminator-Free Image-to-Image Translation," Proceedings of the Thirty-First International Joint Conference on Artificial Intelligence (IJCAI-22), pp. 834-840 (2022).

Khader, F. et al., "Denoising diffusion probabilistic models for 3D medical image generation," Scientific Reports, vol. 13, 7303, (2023).

* cited by examiner

IMAGE REGISTRATION METHOD AND SYSTEM

BACKGROUND

1. Technical Field

This disclosure relates to an image registration method and system.

2. Related Art

In precision medical surgery, it is often necessary to provide two types of images for doctors to refer to. Through complementary images of different modalities, surgery can be better planned and performed. One of the existing complementary methods is to use computers to automatically calculate image registration (alignment, fitting, registration) to provide more accurately positioned intraoperative information and assist in medical precision.

SUMMARY

According to one or more embodiments of this disclosure, an image registration method is read by a processing device to perform: obtaining a first medical image and a second medical image, wherein the first medical image and the second medical image are generated by different imaging devices, and the first medical image comprises soft and hard tissue image; segmenting the first medical image and the second medical image to obtain a first hard tissue image and a second hard tissue image, respectively; aligning a coordinate axis of the first hard tissue image and a coordinate axis of the second hard tissue image, and obtaining a registration field indicating a corresponding relationship between the first hard tissue image and the second hard tissue image; obtaining a scale ratio between the first hard tissue image and the second hard tissue image according to the registration field; and generating a target soft and hard tissue image according to the scale ratio, the soft and hard tissue image and the second hard tissue image.

According to one or more embodiments of this disclosure, an image registration system includes an imaging device and a processing device connected to the imaging device. The imaging device is configured to generate a first medical image, wherein the first medical image comprises soft and hard tissue image The processing device is configured to perform: obtaining the first medical image and a second medical image, wherein the second medical image is generated by another imaging device; segmenting the first medical image and the second medical image to obtain a first hard tissue image and a second hard tissue image, respectively; aligning a coordinate axis of the first hard tissue image and a coordinate axis of the second hard tissue image, and obtaining a registration field indicating a corresponding relationship between the first hard tissue image and the second hard tissue image; obtaining a scale ratio between the first hard tissue image and the second hard tissue image according to the registration field; and generating a target soft and hard tissue image according to the scale ratio, the soft and hard tissue image and the second hard tissue image.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
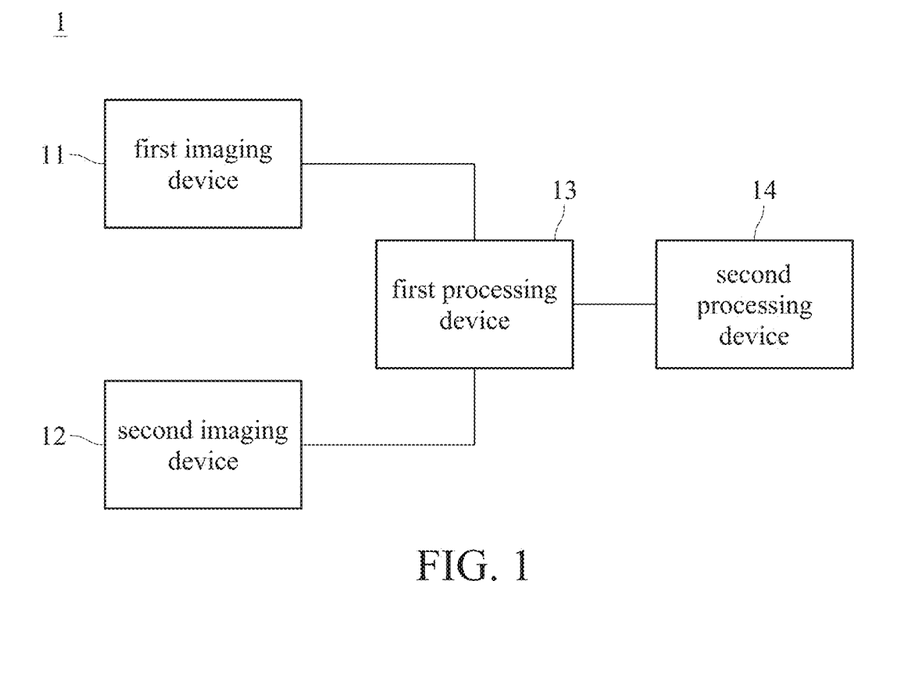
FIG. 1 is a block diagram illustrating an image registration system according to an embodiment of the present disclosure.

Please refer to FIG. 1, wherein FIG. 1 is a block diagram illustrating an image registration system according to an embodiment of the present disclosure. As shown in FIG. 1, the image registration system 1 includes a first imaging device 11, a second imaging device 12, a first processing device 13 and a second processing device 14. The first imaging device 11 and the second imaging device 12 are connected to the first processing device 13, and the first processing device 13 is connected to the second processing device 14.

The first imaging device 11 may be medical imaging equipment configured to obtain image including both hard tissue and soft tissue, such as magnetic resonance imaging (MRI) equipment. Further, the first imaging device 11 may be medical imaging equipment configured to obtain hard and soft tissues image before a surgical operation.

The second imaging device 12 may be medical imaging equipment configured to obtain hard tissue image, such as C-Arm imaging equipment, computed tomography (CT) equipment, MRI equipment or X-ray equipment. Further, the second imaging device 12 may be medical imaging equipment configured to obtain hard tissue image during a surgical operation.

The first processing device 13 and the second processing device 14 are, for example, computers, and may each include one or more processors. The processor is, for example, a central processing unit, a graphics processing unit, a microcontroller, a programmable logic controller or any other processor with signal processing function. The first processing device 13 is configured to register image generated by the first imaging device 11 and image generated by the second imaging device 12. The first processing device 13 may be configured to perform said registration by using one or more artificial intelligence models, and the second processing device 14 may be configured to train said one or more artificial intelligence models.

In the image registration system 1, the first imaging device 11 and the second processing device 14 are selectively disposed. In other words, the first processing device 13 may also obtain image containing both hard tissue and soft tissue at the same time from external source, and the training of the artificial intelligence models may also be performed by the first processing device 13. That is, the first processing device 13 and the second processing device 14 described in the present disclosure may be a single processing unit.

Figure 2:
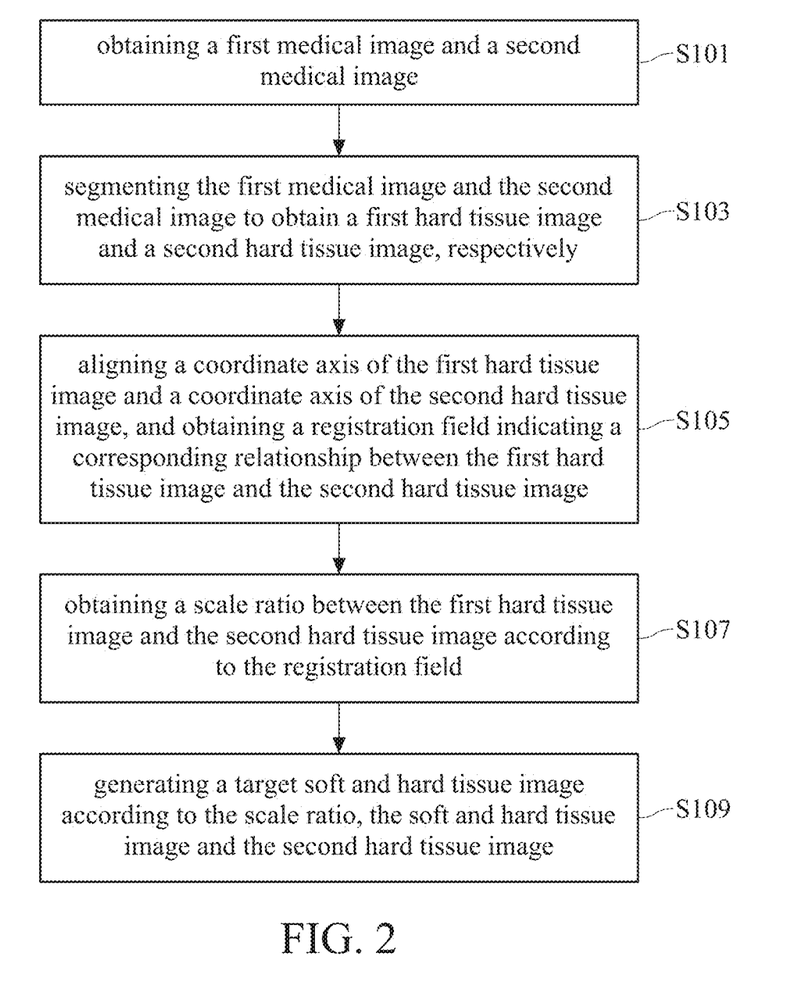
FIG. 2 is a flowchart illustrating an image registration method according to an embodiment of the present disclosure.

Please refer to FIG. 1 and FIG. 2, wherein FIG. 2 is a flowchart illustrating an image registration method according to an embodiment of the present disclosure. As shown in FIG. 2, the image registration method is, for example, a software program, and is read by a processing device to perform steps including: step S101: obtaining a first medical image and a second medical image; step S103: segmenting the first medical image and the second medical image to obtain a first hard tissue image and a second hard tissue image, respectively; step S105: aligning a coordinate axis of the first hard tissue image and a coordinate axis of the second hard tissue image, and obtaining a registration field indicating a corresponding relationship between the first hard tissue image and the second hard tissue image; step S107: obtaining a scale ratio between the first hard tissue image and the second hard tissue image according to the registration field; and step S109: generating a target soft and hard tissue image according to the scale ratio, the soft and hard tissue image and the second hard tissue image.

In step S101, the first processing device 13 obtains the first medical image and the second medical image. The first medical image and the second medical image are generated by different imaging devices, and the first medical image comprises soft and hard tissue image, and the second medical image at least comprises hard tissue image. For example, the first processing device 13 obtains the first medical image from the first imaging device 11, and may obtain the second medical image from the second imaging device 12.

Figure 3:
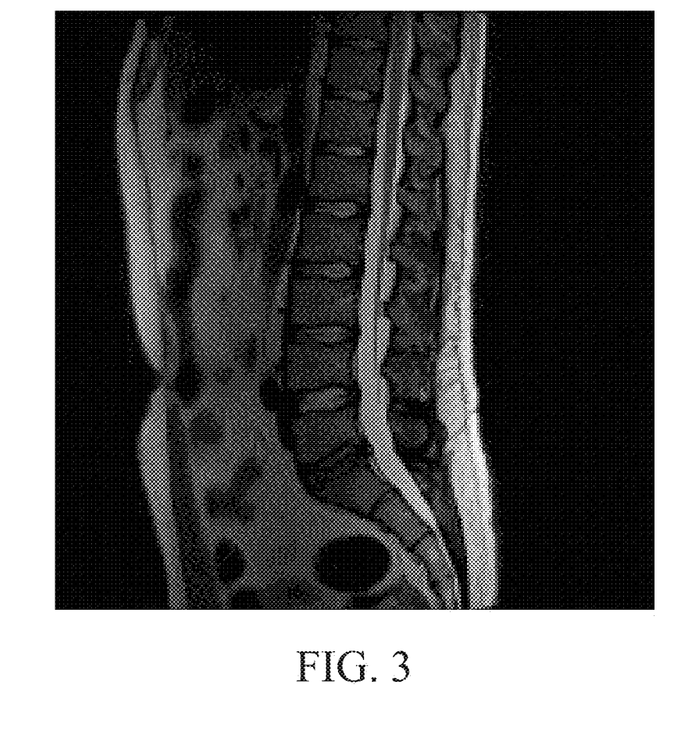
FIG. 3 and FIG. 4 are schematic diagrams of a medical image and a hard tissue image, respectively.
Figure 4:
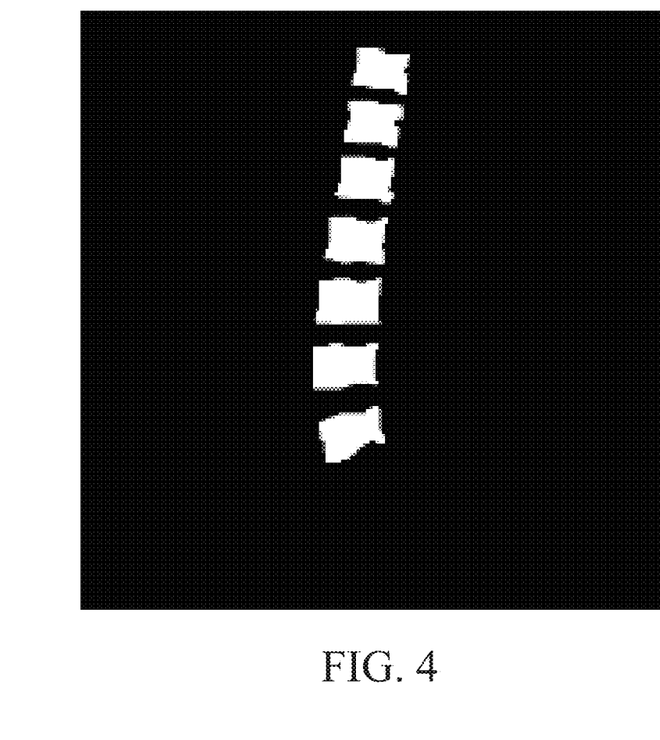

In step S103, the first processing device 13 cuts out the first medical image to obtain the first hard tissue image and cuts out the second medical image to obtain the second hard tissue image. For example, the first processing device 13 may input the first medical image into a trained first segmentation model to obtain the first hard tissue image and input the second medical image into a trained second segmentation model to obtain the second hard tissue image. Please refer to FIG. 3 and FIG. 4, wherein FIG. 3 and FIG. 4 are schematic diagrams of a medical image and a hard tissue image, respectively, and the medical image shown in FIG. 3 is generated by MRI equipment. Take FIG. 3 and FIG. 4 for example, the image shown in FIG. 3 is the first medical image, and the image shown in FIG. 4 is the first hard tissue image obtained by segmenting the first medical image.

In step S105, the first processing device 13 aligns the coordinate axis of the first hard tissue image and the coordinate axis of the second hard tissue image, wherein the first hard tissue image and the second hard tissue image used for aligning the coordinate axes may be three-dimensional (3D) images image. Specifically, the first medical image and the second medical image may each have their own digital imaging and communications in medicine (DICOM) information, and the DICOM information includes image orientation, location of image starting point in the anatomical space, location of image slice, interval between slices, thickness of the slice, and the manufacturer of the imaging device. Therefore, the first processing device 13 may perform a series of processing steps according to the DICOM information of the first medical image and the second medical image, respectively, to align the coordinate axis of the first hard tissue image and the coordinate axis of the second hard tissue image.

Assuming that the abdomen is the origin, the right-hand direction and left-hand direction correspond to the +X-axis direction and −X-axis direction, respectively; the anterior side and the posterior side (i.e., the back) of the body correspond to the +Y-axis direction and −Y-axis direction, respectively; and the head direction and the foot direction correspond to the +Z-axis direction and −Z-axis direction, respectively. The content of said series of processing steps are described below. First, take the sagittal plane as an example, the first processing device 13 may determine whether the first hard tissue image is stored toward +X-axis direction or −X-axis direction with respective to the sagittal plane, and whether the second hard tissue image extends toward +X-axis direction or −X-axis direction with respective to the sagittal plane. Therefore, when the storage direction of the first hard tissue image is opposite from the extension direction of the second hard tissue image, the first processing device 13 may reverse the storage direction of the first hard tissue image on the X axis. Similarly, the first processing device 13 may determine the storage direction of the first hard tissue image on the Y axis and the extension direction of the second hard tissue image on the Y axis. Therefore, when the storage direction of the first hard tissue image on the Y axis is opposite from the extension direction of the second hard tissue image on the Y axis, the first processing device 13 may reverse the storage direction of the first hard tissue image on the Y axis. The contents regarding the Z axis is the same as the X axis and the Y axis, its details are not repeated herein.

Further, after the alignment, the first processing device 13 registers the first hard tissue image and the second hard tissue image, and obtains the registration field, wherein the registration field indicates the corresponding relationship between the first hard tissue image and the second hard tissue image. If the first processing device 13 uses the second hard tissue image as a reference, the first processing device 13 may register the first hard tissue image to the second hard tissue image to obtain the registration field, and the registration field may record a displacement relationship between each point in the first hard tissue image and the corresponding point in the second hard tissue image. In addition, if the first processing device 13 uses the second hard tissue image as a reference, the first processing device 13 may register the first hard tissue image to the second hard tissue image to generate the third hard tissue image, and the registration field may record which point of the first hard tissue image forms a corresponding point in the third hard tissue image. For example, the first processing device 13 may input the first hard tissue image and the second hard tissue image into a trained registration model to obtain the registration field and the third hard tissue image output by the registration model.

Moreover, the registration model may include a first registration model, a second registration model and a third registration model. For the first medical image and the second medical image processed by the first registration model, the first medical image and the second medical image are both images captured when the patient is in the supine posture; for the first medical image and the second medical image processed by the second registration model, the first medical image and the second medical image are both images captured when the patient is in the prone posture; and for the first medical image and the second medical image processed by the third registration model, the first medical image is an image captured when the patient is in the supine posture, and the second medical image is an image captured when the patient is in the prone posture. Therefore, the first processing device 13 may select a corresponding one of the first registration model, the second registration model and the third registration model according to the postures of the patient in the first medical image and the second medical image to perform step S105.

Through registration models corresponding to different postures, even if the preoperative medical image and the intraoperative medical image are taken with the patient being in different postures, the different registration models may be used to estimate nonlinear deformations caused by different postures between preoperative supine posture and another intraoperative posture.

Figure 5:
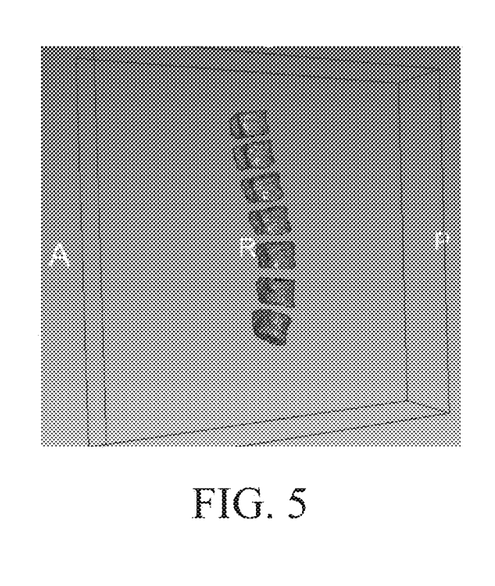
FIG. 5 is a schematic diagram of a first hard tissue image.
Figure 6:
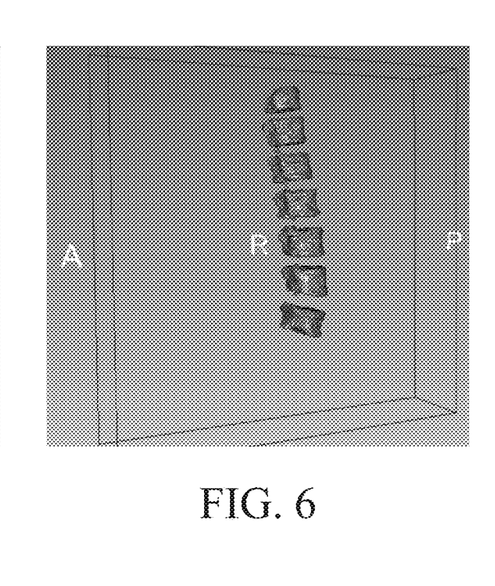
FIG. 6 is a third hard tissue image generated by registering the first hard tissue image.
Figure 7:
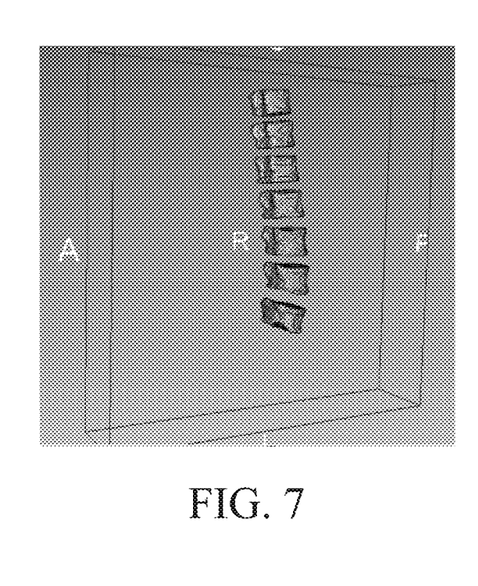
FIG. 7 is a second hard tissue image.

Please refer to FIG. 5 to FIG. 7, wherein FIG. 5 is a schematic diagram of a first hard tissue image, FIG. 6 is a third hard tissue image generated by registering the first hard tissue image, and FIG. 7 is a second hard tissue image. In FIG. 5 to FIG. 7, "A" represents anterior side, "P" represents posterior side, and "R" represents right side. As shown in FIG. and FIG. 6, after the alignment of coordinate axes and the registration, the first hard tissue image may be nonlinearly converted into the third hard tissue image, the third hard tissue image is similar to the second hard tissue image shown in FIG. 7.

In step S107, the first processing device 13 obtains the scale ratio between the first hard tissue image and the second hard tissue image according to the registration field. The third hard tissue image may include a plurality of voxels. The first processing device 13 may determine coordinate information corresponding to each voxel according to the registration field, and determine the scale ratio according to the coordinate information. In other words, the scale ratio may represent the scale ratio between the first hard tissue image and the third hard tissue image.

In step S109, the first processing device 13 generates the target soft and hard tissue image according to the scale ratio, the soft and hard tissue image of the first medical image and the second hard tissue image. For example, the first processing device 13 may input the scale ratio, the soft and hard tissue image of the first medical image and the second hard tissue image into a trained soft and hard tissue generation model to obtain the target soft and hard tissue image inferred by the soft and hard tissue generation model. It should be noted that the third hard tissue image is generated for obtaining the scale ratio, and in order to generate accurate target soft and hard tissue image, the first processing device 13 uses the second hard tissue image to generate the target soft and hard tissue image.

According to the image registration method and system of the above embodiments, the cross-modal soft and hard tissue image may be obtained by nonlinear deformation registration. Therefore, more accurate information may be provided to the surgeon during surgical operation to lower surgical risks. Also, even if only limited information of hard tissue (for example, bone) is available intraoperatively, the preoperative soft and hard tissue image may still be nonlinearly registered with the intraoperative hard tissue image to complete accurate nonlinear deformation registration, thereby calculating the 3D soft and hard tissue image required during surgery.

Figure 8:
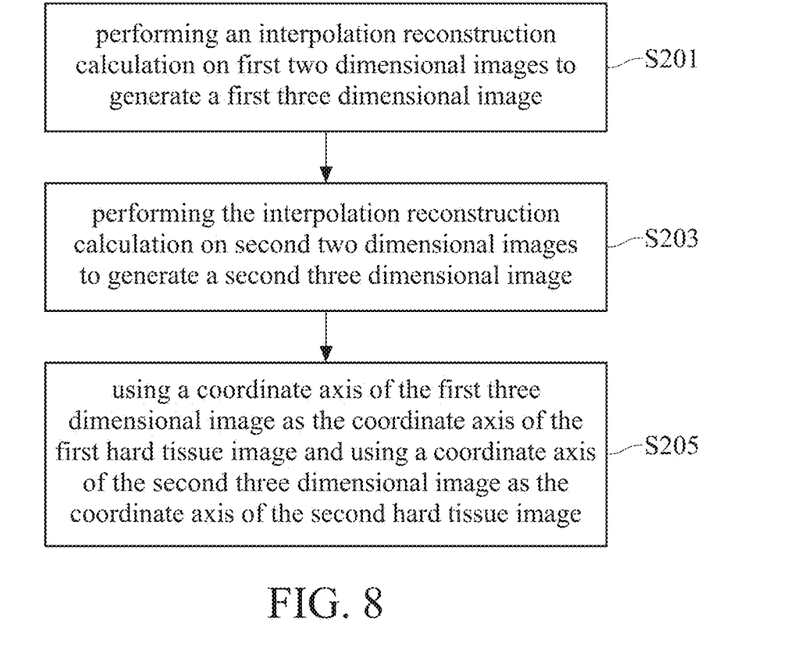
FIG. 8 is a flowchart illustrating reconstructing two dimensional images into three dimensional images according to an embodiment of the present disclosure.

Please refer to FIG. 1 and FIG. 8, wherein FIG. 8 is a flowchart illustrating reconstructing two dimensional images into three dimensional images according to an embodiment of the present disclosure. In FIG. 8, the first hard tissue image may be a plurality of first two dimensional (2D) images, the second hard tissue image may be a plurality of second 2D images, and FIG. 8 may be regarded as a detail flowchart of an embodiment of step S105 of FIG. 2. As shown in FIG. 8, reconstructing 2D images into three dimensional images includes: step S201: performing an interpolation reconstruction calculation on the plurality of first two dimensional images to generate a first three dimensional image; step S203: performing the interpolation reconstruction calculation on the plurality of second two dimensional images to generate a second three dimensional image; and step S205: using a coordinate axis of the first three dimensional image as the coordinate axis of the first hard tissue image and using a coordinate axis of the second three dimensional image as the coordinate axis of the second hard tissue image. FIG. 8 illustrates step S201 as performed before step S203, but step S201 may also be performed after step S203, or step S201 and step S203 are performed at the same time.

In step S201 and step S203, when the segmented first hard tissue image is the first 2D images and the segmented second hard tissue image is the second 2D images, the first processing device 13 may perform the interpolation reconstruction calculation on the first 2D images to generate one first 3D image, and the first processing device 13 may perform the interpolation reconstruction calculation on the second 2D images to generate one second 3D image.

In addition, reconstructing 2D images into a 3D image may also be implemented by a reconstruction algorithm. The reconstruction algorithm may be a trained neural network model, such as the known generative adversarial network (GAN) model. The first processing device 13 may input 2D images into the GAN model, and the GAN model generates image information on a reconstruction direction, thereby forming the 3D image.

In step S205, the first processing device 13 may use the coordinate axis of the first 3D image as the coordinate axis of the first hard tissue image, and use the coordinate axis of the second 3D image as the coordinate axis of the second hard tissue image. Then, the first processing device 13 may obtain the aligned coordinate axes.

In other words, in the embodiment of FIG. 8, if the segmented hard tissue images are 2D hard tissue images, the first processing device 13 may first perform the interpolation reconstruction calculation on the 2D hard tissue images to generate a 3D hard tissue image, and then perform the coordinate axes alignment.

In addition, after the reconstruction, during the operation of coordinate axes alignment, the extension direction of the second hard tissue image described above may be the reconstruction direction of the second hard tissue image.

Figure 9:
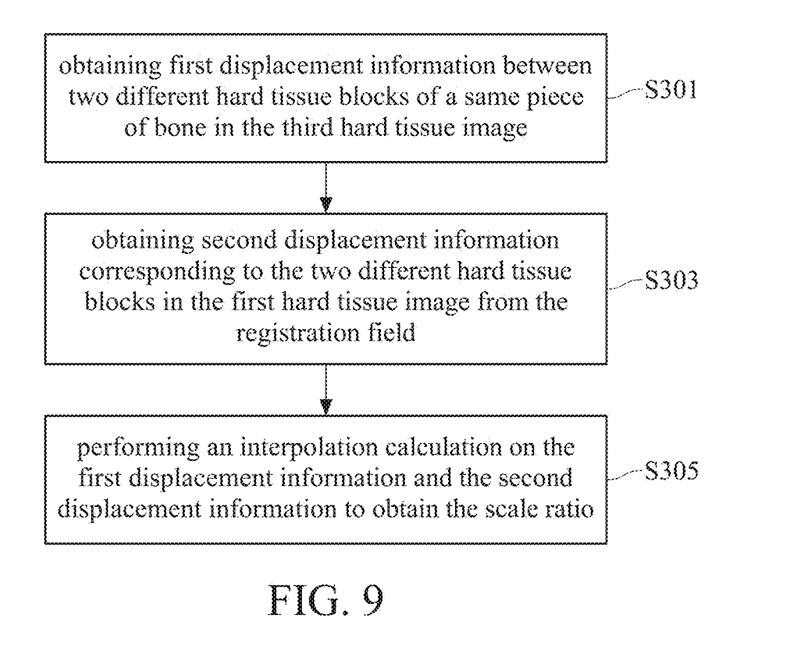
FIG. 9 is a flowchart illustrating obtaining a scale ratio according to an embodiment of the present disclosure.

Please refer to FIG. 1 and FIG. 9, wherein FIG. 9 is a flowchart illustrating obtaining a scale ratio according to an embodiment of the present disclosure. FIG. 9 may be regarded as a detail flowchart of an embodiment of step S107 of FIG. 2. As shown in FIG. 9, the method of obtaining the scale ratio includes: step S301: obtaining first displacement information between two different hard tissue blocks of a same piece of bone in the third hard tissue image; step S303: obtaining second displacement information corresponding to the two different hard tissue blocks in the first hard tissue image from the registration field; and step S305: performing an interpolation calculation on the first displacement information and the second displacement information to obtain the scale ratio.

In step S301, the first processing device 13 obtains one hard tissue voxel and a different hard tissue voxel from the same piece of bone in the third hard tissue image as two first hard tissue blocks, and performs subtraction on the coordinates of the two first hard tissue blocks to obtain the first displacement information. Said same piece of bone is, for example, a vertebra in the cervical spine, a vertebra in the thoracic spine, a vertebra in the lumbar spine, scapula or femur etc., the present disclosure is not limited thereto. For example, the first processing device 13 may select one hard tissue voxel and another hard tissue voxel from the same bone according to known image processing techniques (for example, pixel connectivity analysis, silhouette analysis etc.), the method of selecting the hard tissue voxels is not limited thereto. Moreover, the coordinates of the two first hard tissue blocks may be presented by equation (1) and equation (2) below, respectively, and the first displacement information may be presented by equation (3) below.

$$c_i^t = (x_i^t, y_i^t, z_i^t) \quad \text{equation (1)}$$

$$c_j^t = (x_j^t, y_j^t, z_j^t) \quad \text{equation (2)}$$

$$d_{ij}^t = c_i^t - c_j^t \quad \text{equation (3)}$$

In step S303, the first processing device 13 obtains coordinates of two second hard tissue blocks according to coordinates of the two first hard tissue blocks and the registration field, and performs subtraction on the coordinates of the two second hard tissue blocks to obtain the second displacement information. As described above, the registration field indicates the corresponding relationship between the first hard tissue image and the second hard tissue image, and moreover, the registration field indicates the corresponding relationship between the first hard tissue image and the third hard tissue image. Therefore, according to the corresponding relationship recorded by the registration field, the first processing device 13 may obtain coordinates of the two second hard tissue blocks corresponding to the coordinates of the two first hard tissue blocks from the second hard tissue image or the third hard tissue image. The coordinates of the two second hard tissue blocks of the same bone may be presented by equation (4) and equation (5) below, respectively, and the second displacement information may be presented by equation (6) below.

$$c_i^m = (x_i^m, y_i^m, z_i^m) \quad \text{equation (4)}$$

$$c_j^m = (x_j^m, y_j^m, z_j^m) \quad \text{equation (5)}$$

$$d_{ij}^m = c_i^m - c_j^m \quad \text{equation (6)}$$

In step S305, the first processing device 13 performs the interpolation calculation on the first displacement information and the second displacement information to obtain the scale ratio. Moreover, performing the interpolation calculation to obtain the scale ratio may be implemented by equation (7) below, wherein s is the scale ratio.

$$d_{ij}^t (d_{ij}^t)^T = s^2 [d_{ij}^m (d_{ij}^m)^T] \quad \text{equation (7)}$$

It should be noted that the above uses a pair of first hard tissue block and second hard tissue block as example, the first processing device 13 may collect a plurality of pairs of first hard tissue blocks and second hard tissue blocks to obtain a plurality of scale ratios, and may use an average of the scale ratios as the final scale ratio to obtain a more accurate scale ratio.

Figure 10:
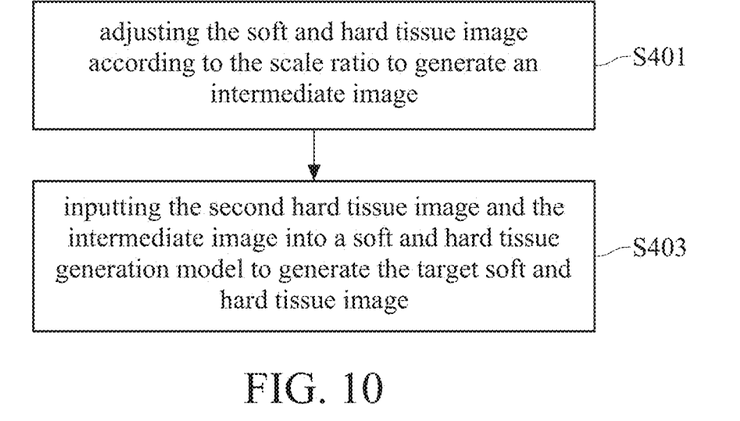
FIG. 10 is a flowchart illustrating generating the target soft and hard tissue image according to an embodiment of the present disclosure.

Please refer to FIG. 1 and FIG. 10, wherein FIG. 10 is a flowchart illustrating generating the target soft and hard tissue image according to an embodiment of the present disclosure. FIG. 10 may be regarded as a detail flowchart of an embodiment of step S109 of FIG. 2. As shown in FIG. 10, the generation of the target soft and hard tissue image includes: step S401: adjusting the soft and hard tissue image according to the scale ratio to generate an intermediate image; and step S403: inputting the second hard tissue image and the intermediate image into a soft and hard tissue generation model to generate the target soft and hard tissue image.

In step S401, the first processing device 13 adjusts the soft and hard tissue image in the first medical image into the intermediate image according to the scale ratio. In other words, the first processing device 13 performs sampling on the first medical image according to the scale ratio to obtain the intermediate image. In step S403, the first processing device 13 inputs the second hard tissue image and the intermediate image into the trained soft and hard tissue generation model to obtain the target soft and hard tissue image generated by the soft and hard tissue generation model. Further, the intermediate image and the second hard tissue image input into the soft and hard tissue generation model are 3D images.

Figure 11:
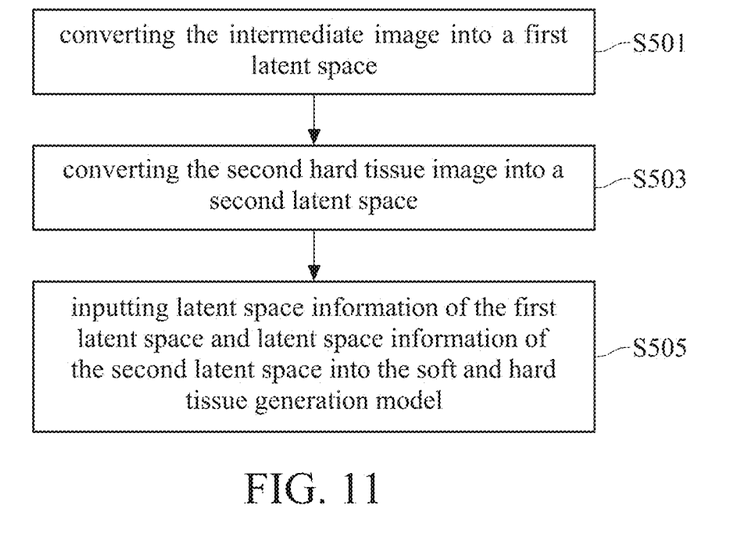
FIG. 11 is a flowchart illustrating converting images into latent spaces according to an embodiment of the present disclosure.

Please refer to FIG. 1 and FIG. 11, wherein FIG. 11 is a flowchart illustrating converting images into latent spaces according to an embodiment of the present disclosure. FIG. 11 may be regarded as a detail flowchart of an embodiment of step S403 of FIG. 10. As shown in FIG. 11, converting images into latent spaces includes: step S501: converting the intermediate image into a first latent space; step S503: converting the second hard tissue image into a second latent space; and step S505: inputting latent space information of the first latent space and latent space information of the second latent space into the soft and hard tissue generation model. FIG. 11 illustrates step S501 as performed before step S503, but step S501 may also be performed after step S503, or step S501 and step S503 may be performed at the same time.

In step S501, the first processing device 13 outputs the intermediate image to an encoder to performing encoding, thereby converting the intermediate image into the first latent space (P). In step S503, the first processing device 13 outputs the second hard tissue image to another encoder to performing encoding, thereby converting the second hard tissue image into the second latent space (I). The encoder is, for example, a variational auto-encoder (VAE) or a variation of VAE, such as a sparse auto encoder, an adversarial auto encoder, an attention auto encoder; or, a GAN model may be used as the encoder or the GAN model may be used as a variation of the encoder, such as an information maximizing generative adversarial network (InfoGAN).

Then, in step S505, the first processing device 13 inputs the latent space information of the first latent space and the latent space information of the second latent space into the soft and hard tissue generation model to obtain the target soft and hard tissue image.

Accordingly, when there is no soft tissue image for surgeon's reference during the surgical operation, by using the scale ratio and the latent space information to generate the target soft and hard tissue image, the soft and hard tissue generation model may be assisted to generate accurate 3D target soft and hard tissue image.

Figure 12:
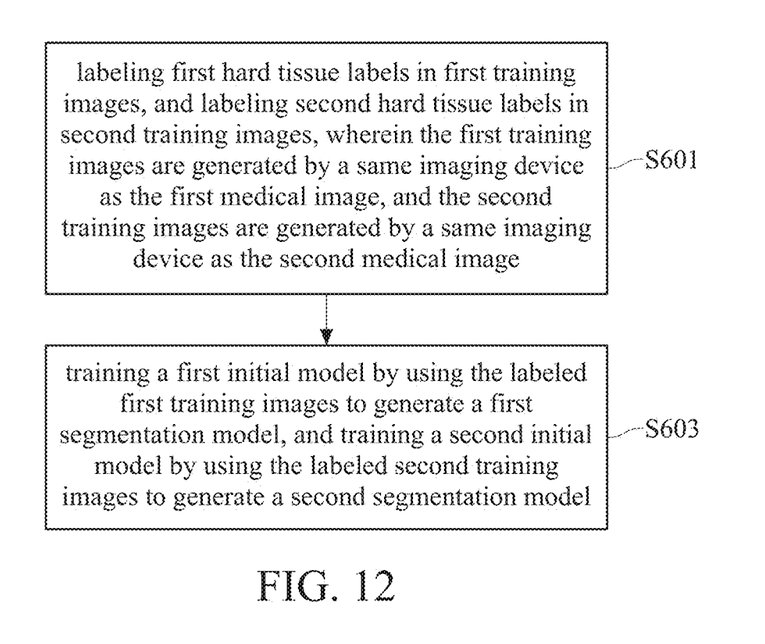
FIG. 12 is a flowchart illustrating generating segmentation models according to an embodiment of the present disclosure.

Please refer to FIG. 1 and FIG. 12, wherein FIG. 12 is a flowchart illustrating generating segmentation models according to an embodiment of the present disclosure. As shown in FIG. 12, the generation of the segmentation models includes: step S601: labeling a plurality of first hard tissue labels in a plurality of first training images, and labeling a plurality of second hard tissue labels in a plurality of second training images, wherein the plurality of first training images are generated by a same imaging device as the first medical image, and the plurality of second training images are generated by a same imaging device as the second medical image; and step S603: training a first initial model by using the plurality of labeled first training images to generate the first segmentation model, and training a second initial model by using the plurality of labeled second training images to generate the second segmentation model.

In step S601, the first processing device 13 cuts out the hard tissue portion of each first training image as one first hard tissue label, and cuts out the hard tissue portion of each second training image as one second hard tissue label. In other words, the first hard tissue label may be the hard tissue image in the first training image, and the second hard tissue label may be the hard tissue image in the second training images. For example, the format of the hard tissue label may be the hard tissue image shown in FIG. 4. The first training images are generated by the same imaging device (for example, the first imaging device 11 in FIG. 1) as that of the first medical image, and the second training images are generated by the same imaging device (for example, the second imaging device 12 in FIG. 1) as that of the second medical image.

In step S603, the first processing device 13 trains the first initial model by using the labeled first training images to generate the first segmentation model, and trains the second initial model by using the labeled second training images to generate the second segmentation model, wherein the first segmentation model and the second segmentation model may be supervised learning model. The first segmentation model and the second segmentation model may be used to implement step S103 of FIG. 2.

In addition, during the training of the first segmentation model and the second segmentation model, the first processing device 13 may determine whether the accuracy of each of the first segmentation model and the second segmentation model reaches a default standard. Specifically, the first processing device 13 may input a first evaluation image that is the same type of image as the first training image into the first segmentation model, and input a the second evaluation image that is the same type of image as the second training image into the second segmentation model, to obtain a first evaluation hard tissue image output by the first segmentation model and a second evaluation hard tissue image output by the second segmentation model. Then, the first processing device 13 compares the first evaluation hard tissue image with an expected hard tissue image to obtain a similarity therebetween, to generate a first loss value, and compares the second evaluation hard tissue image with the expected hard tissue image to obtain a similarity therebetween, to generate a second loss value. Then, the first processing device 13 updates the parameter(s) of the first segmentation model according to the first loss value and updates the parameter(s) of the second segmentation model according to the second loss value.

In addition, the first processing device 13 may be further configured to train the registration model. Take the first training images and the second training images described above for example, the first processing device 13 may use the hard tissue images of the first training images and the hard tissue images of the second training images to train an unsupervised model to generate the registration model. Moreover, the first processing device 13 may train three registration models, wherein the first registration model is generated by training a unsupervised model using the first training images and the second training images that all correspond to the supine posture, the second registration model is generated by training a unsupervised model using the first training images and the second training images that all correspond to the prone posture, and the third registration model is generated by training a unsupervised model using the first training images that correspond to the supine posture and the second training images that correspond to the prone posture.

During the training of the registration model, the first processing device 13 may determine whether the accuracy of the registration model reaches a default standard. Take the first registration model for example, the first processing device 13 may input a first evaluation image that is the same type of image as the first training images and in the supine posture along with a second evaluation image that is the same type of image as the second training images and in the supine posture into the first registration model, to obtain a third evaluation image output by the first registration model. Then, the first processing device 13 compares the third evaluation image with an expected registered image to obtain a similarity therebetween to generate a loss value, then updates the parameter(s) of the first registration model according to the loss value. The method of evaluating the accuracy of the third registration model is similar to the second registration model, the difference is that the evaluation of the second registration model is performed by using evaluation images all corresponding to the prone posture, and the evaluation of the third registration model is performed by using evaluation image corresponding to the prone posture and evaluation image corresponding to the supine posture, their details are not repeated herein.

In addition, the first processing device 13 may be further configured to train the soft and hard tissue generation model. The soft and hard tissue generation model may include a sub-model, wherein the sub-model may include a U-net model or variations of the U-net model. Take the first training images and the second training images described above for example, the first processing device 13 may convert the first training images into the first latent space and convert the second training images into the second latent space, to compress the first training images and the second training images into latent spaces. The method of converting the image into the latent space may be the same as step S501 and step S503 shown in FIG. 11, the details are not repeated herein. Then, the first processing device 13 trains the sub-model using the latent space information corresponding to the first training images and the second training images to generate the soft and hard tissue generation model.

Further, during training, the first processing device 13 may determine whether the accuracy of the soft and hard tissue generation model reaches a default standard. Specifically, the first processing device 13 may convert the first evaluation image that is the same type of image as the first training image into the first latent space, and convert the second evaluation image that is the same type of image as the second training image into the second latent space, wherein the method of converting the image into the latent space may be the same as step S501 and step S503 shown in FIG. 11, the details are not repeated herein. The first processing device 13 inputs the latent space information corresponding to the first evaluation image and the latent space information corresponding to the second evaluation image along with the soft and hard tissue image obtained from the first imaging device 11 into the soft and hard tissue generation model, wherein the soft and hard tissue image may be regarded as a target image of the soft and hard tissue generation model (i.e. the correct image). The first processing device 13 performs a forward diffusion on the soft and hard tissue image (the intraoperative target), and uses noise predictor to predict noises and remove the noises, wherein the process of removing the noises refers to the latent space information corresponding to the first evaluation image and the latent space information corresponding to the second evaluation image. Also, similar to the training of the registration model, the first training images may correspond to a first posture, the second training images may correspond to a second posture, and the soft and hard tissue image may correspond to a second posture. The first posture and the second posture may be the same as each other or different from each other, the first posture and the third posture may be the same as each other or different from each other, and the second posture may be the same as the third posture. For example, the first posture and the second posture may each be the prone posture or the supine posture. The first posture to the third posture described above are only examples, the present disclosure is not limited thereto. The first processing device 13 may use a plurality of first training images, a plurality of second training images and the corresponding soft and hard tissue images as one training dataset. In other words, during the training of the soft and hard tissue generation model, the first processing device 13 may use images corresponding to different postures for training.

Then, the first processing device 13 compares the soft and hard tissue image where the noises are removed with an expected (the intraoperative target) soft and hard tissue image to obtain a similarity therebetween, to generate a loss value. Then the first processing device 13 updates the parameter(s) of the soft and hard tissue generation model according to the loss value. Further, the weight of the loss value corresponding to a lesion area may be higher than the weights of the loss values of other non-lesion areas. The first processing device 13 sends all loss values back to the soft and hard tissue generation model to update the parameter(s) of the soft and hard tissue generation model.

In addition, in order to expand the soft and hard tissue generation model to other different usage scenarios, ControlNet may be added to the soft and hard tissue generation model. Said different usage scenarios may be the posture corresponding to different first medical images or the posture corresponding to different second medical images. For example, assuming that before ControlNet is added, the soft and hard tissue generation model (referred to as "first model" hereinafter) may generate the target soft and hard tissue image of the second posture according to the soft and hard tissue image of the first posture and the hard tissue image of the second posture. Then, after ControlNet is added, the soft and hard tissue generation model (referred to as "second model" hereinafter) may generate the target soft and hard tissue image of the second posture according to the soft and hard tissue image of the third posture and the hard tissue image of the second posture. Similarly, the second model may also generate the target soft and hard tissue image of another posture according to the soft and hard tissue image of the first posture and a hard tissue image of said another posture.

Specifically, the first processing device 13 may use the parameter weights of the trained first model to combine ControlNet, and only trains a decoding layer of the soft and hard tissue generation model to obtain the second model. Further, the first processing device 13 may compare the soft and hard tissue image output by the second model with an actual soft and hard tissue image to determine a loss value, and adjust the parameter(s) of the second model accordingly. Through the above training, when expanding the application to similar scenarios, the data collection and training costs of the scenario may be reduced. That is, on the basis that the soft and hard tissue generation model may handle converting the first posture to the second posture has been trained with a large amount of data, through the auxiliary training of ControlNet, only part of the content changes (for example, posture changes) needs to be focused on to generate other soft and hard tissue generation models that may handle images with changes in posture (from the third posture to the second posture).

It should be noted that the goal of the model training of one or more embodiments described above is to minimize the loss value. Through updating model parameter(s) according to the loss values of the segmentation model, the registration model and the soft and hard tissue generation model, the output of these models may be more accurate.

The data labeling, model training and determining the accuracy of the models performed by the first processing device 13 described above may also be performed by the second processing device 14. Further, when model training is performed by the second processing device 14, the second processing device 14 may output the trained model and/or the model after accuracy evaluation to the first processing device 13 or to cloud, memories etc. that are accessible by the first processing device 13.

In view of the above description, the image registration method and system according to one or more embodiments of the present disclosure, the cross-modal soft and hard tissue image may be obtained by nonlinear deformation registration. Therefore, more accurate information may be provided to the surgeon during surgical operation to lower surgical risks. Also, even if only limited information of hard tissue (for example, bone) is available intraoperatively, the preoperative soft and hard tissue image may still be nonlinearly registered with the intraoperative hard tissue image to complete accurate nonlinear deformation registration, thereby calculating the 3D soft and hard tissue image required during surgery. In addition, by using the scale ratio and the latent space information to generate the target soft and hard tissue image, the soft and hard tissue generation model may be assisted to generate accurate 3D target soft and hard tissue image. Further, even if the preoperative medical image and the intraoperative medical image are taken with the patient being in different postures, the corresponding registration model may be used to estimate nonlinear deformations caused by different postures between preoperative supine posture and another intraoperative posture.

What is claimed is:

1. An image registration method, read by a processing device to perform:
obtaining a first medical image and a second medical image, wherein the first medical image and the second medical image are generated by different imaging devices, and the first medical image comprises soft and hard tissue image;
segmenting the first medical image and the second medical image to obtain a first hard tissue image and a second hard tissue image, respectively;
aligning a coordinate axis of the first hard tissue image and a coordinate axis of the second hard tissue image, and obtaining a registration field indicating a corresponding relationship between the first hard tissue image and the second hard tissue image;
obtaining a scale ratio between the first hard tissue image and the second hard tissue image according to the registration field; and
generating a target soft and hard tissue image according to the scale ratio, the soft and hard tissue image and the second hard tissue image.

2. The image registration method according to claim 1, wherein the first hard tissue image is a plurality of first two dimensional images, the second hard tissue image is a plurality of second two dimensional images, and aligning the coordinate axis of the first hard tissue image and the coordinate axis of the second hard tissue image comprises:
performing an interpolation reconstruction calculation on the plurality of first two dimensional images to generate a first three dimensional image;
performing the interpolation reconstruction calculation on the plurality of second two dimensional images to generate a second three dimensional image; and
using a coordinate axis of the first three dimensional image as the coordinate axis of the first hard tissue image and using a coordinate axis of the second three dimensional image as the coordinate axis of the second hard tissue image.

3. The image registration method according to claim 1, wherein obtaining the registration field indicating the corresponding relationship between the first hard tissue image and the second hard tissue image comprises:
inputting the first hard tissue image and the second hard tissue image into a registration model to obtain a third hard tissue image and the registration field.

4. The image registration method according to claim 3, wherein obtaining the scale ratio between the first hard tissue image and the second hard tissue image according to the registration field comprises:
obtaining first displacement information between two different hard tissue blocks of a same piece of bone in the third hard tissue image;
obtaining second displacement information corresponding to the two different hard tissue blocks in the first hard tissue image from the registration field; and
performing an interpolation calculation on the first displacement information and the second displacement information to obtain the scale ratio.

5. The image registration method according to claim 3, further comprising, by the processing device or another processing device, performing:
performing training by using a plurality of first training images and a plurality of second training images to obtain the registration model,
wherein the plurality of first training images are generated by a same imaging device as the first medical image, and the plurality of second training images are generated by a same imaging device as the second medical image, and
wherein the plurality of first training images correspond to one of a supine posture and a prone posture, and the plurality of second training images correspond to one of the supine posture and the prone posture.

6. The image registration method according to claim 1, wherein generating the target soft and hard tissue image according to the scale ratio, the soft and hard tissue image and the second hard tissue image comprises:
adjusting the soft and hard tissue image according to the scale ratio to generate an intermediate image; and
inputting the second hard tissue image and the intermediate image into a soft and hard tissue generation model to generate the target soft and hard tissue image.

7. The image registration method according to claim 6, wherein inputting the second hard tissue image and the intermediate image into the soft and hard tissue generation model to generate the target soft and hard tissue image comprises:
converting the intermediate image into a first latent space;
converting the second hard tissue image into a second latent space; and
inputting latent space information of the first latent space and latent space information of the second latent space into the soft and hard tissue generation model.

8. The image registration method according to claim 6, further comprising, by the processing device or another processing device, performing:
performing training by using a plurality of first training images and a plurality of second training images to obtain the soft and hard tissue generation model,
wherein the plurality of first training images are generated by a same imaging device as the first medical image, and the plurality of second training images are generated by a same imaging device as the second medical image, and
wherein the plurality of first training images correspond to one of a supine posture and a prone posture, and the plurality of second training images correspond to one of the supine posture and the prone posture.

9. The image registration method according to claim 1, wherein segmenting the first medical image and the second medical image to obtain the first hard tissue image and the second hard tissue image, respectively comprises:
inputting the first medical image into a first segmentation model to obtain the first hard tissue image; and
inputting the second medical image into a second segmentation model to obtain the second hard tissue image.

10. The image registration method according to claim 9, further comprising, by the processing device or another processing device, performing:
labeling a plurality of first hard tissue labels in a plurality of first training images, and labeling a plurality of second hard tissue labels in a plurality of second training images, wherein the plurality of first training images are generated by a same imaging device as the first medical image, and the plurality of second training images are generated by a same imaging device as the second medical image; and
training a first initial model by using the plurality of labeled first training images to generate the first segmentation model, and training a second initial model by using the plurality of labeled second training images to generate the second segmentation model.

11. An image registration system, comprising:
an imaging device configured to generate a first medical image, wherein the first medical image comprises soft and hard tissue image; and
a processing device connected to the imaging device, and configured to perform:
obtaining the first medical image and a second medical image, wherein the second medical image is generated by another imaging device;
segmenting the first medical image and the second medical image to obtain a first hard tissue image and a second hard tissue image, respectively;
aligning a coordinate axis of the first hard tissue image and a coordinate axis of the second hard tissue image, and obtaining a registration field indicating a corresponding relationship between the first hard tissue image and the second hard tissue image;
obtaining a scale ratio between the first hard tissue image and the second hard tissue image according to the registration field; and
generating a target soft and hard tissue image according to the scale ratio, the soft and hard tissue image and the second hard tissue image.

12. The image registration system according to claim 11, wherein the first hard tissue image is a plurality of first two dimensional images, the second hard tissue image is a plurality of second two dimensional images, and the processing device is configured to perform an interpolation reconstruction calculation on the plurality of first two dimensional images to generate a first three dimensional image; perform the interpolation reconstruction calculation on the plurality of second two dimensional images to generate a second three dimensional image; and use a coordinate axis of the first three dimensional image as the coordinate axis of the first hard tissue image and using a coordinate axis of the second three dimensional image as the coordinate axis of the second hard tissue image.

13. The image registration system according to claim 11, wherein the processing device is configured to input the first hard tissue image and the second hard tissue image into a registration model to obtain a third hard tissue image and the registration field.

14. The image registration system according to claim 13, wherein the processing device is configured to obtain first displacement information between two different hard tissue blocks of a same piece of bone in the third hard tissue image; obtain second displacement information corresponding to the two different hard tissue blocks in the first hard tissue image from the registration field; and perform an interpolation calculation on the first displacement information and the second displacement information to obtain the scale ratio.

15. The image registration system according to claim 13, wherein the processing device is further configured to perform training by using a plurality of first training images and a plurality of second training images to obtain the registration model, wherein the plurality of first training images are generated by a same imaging device as the first medical image, and the plurality of second training images are generated by a same imaging device as the second medical image, and wherein the plurality of first training images correspond to one of a supine posture and a prone posture, and the plurality of second training images correspond to one of the supine posture and the prone posture.

16. The image registration system according to claim 13, further comprising:
another processing device connected to the processing device, wherein the another processing device is configured to perform training by using a plurality of first training images and a plurality of second training images to obtain the registration model, wherein the plurality of first training images are generated by a same imaging device as the first medical image, and the plurality of second training images are generated by a same imaging device as the second medical image, and wherein the plurality of first training images correspond to one of a supine posture and a prone posture, and the plurality of second training images correspond to one of the supine posture and the prone posture.

17. The image registration system according to claim 11, wherein the processing device is further configured to adjust the soft and hard tissue image according to the scale ratio to generate an intermediate image; and input the second hard tissue image and the intermediate image into a soft and hard tissue generation model to generate the target soft and hard tissue image.

18. The image registration system according to claim 17, wherein the processing device is configured to convert the intermediate image into a first latent space; convert the second hard tissue image into a second latent space; and input latent space information of the first latent space and latent space information of the second latent space into the soft and hard tissue generation model.

19. The image registration system according to claim 17, wherein the processing device is further configured to perform training by using a plurality of first training images and a plurality of second training images to obtain the soft and hard tissue generation model, wherein the plurality of first training images are generated by a same imaging device as the first medical image, and the plurality of second training images are generated by a same imaging device as the second medical image, and wherein the plurality of first training images correspond to one of a supine posture and a prone posture, and the plurality of second training images correspond to one of the supine posture and the prone posture.

20. The image registration system according to claim 17, further comprising:
another processing device connected to the processing device, wherein the another processing device is configured to perform training by using a plurality of first training images and a plurality of second training images to obtain the soft and hard tissue generation model, wherein the plurality of first training images are generated by a same imaging device as the first medical image, and the plurality of second training images are generated by a same imaging device as the second medical image, and wherein the plurality of first training images correspond to one of a supine posture and a prone posture, and the plurality of second training images correspond to one of the supine posture and the prone posture.

21. The image registration system according to claim 11, wherein the processing device is configured to input the first medical image into a first segmentation model to obtain the first hard tissue image; and input the second medical image into a second segmentation model to obtain the second hard tissue image.

22. The image registration system according to claim 21, further comprising:
another processing device connected to the processing device, wherein the another processing device is configured to perform:

labeling a plurality of first hard tissue labels in a plurality of first training images, and labeling a plurality of second hard tissue labels in a plurality of second training images, wherein the plurality of first training images are generated by a same imaging device as the first medical image, and the plurality of second training images are generated by a same imaging device as the second medical image; and training a first initial model by using the plurality of labeled first training images to generate the first segmentation model, and training a second initial model by using the plurality of labeled second training images to generate the second segmentation model.

23. The image registration system according to claim 21, wherein the processing device is further configured to perform:

labeling a plurality of first hard tissue labels in a plurality of first training images, and labeling a plurality of second hard tissue labels in a plurality of second training images, wherein the plurality of first training images are generated by a same imaging device as the first medical image, and the plurality of second training images are generated by a same imaging device as the second medical image; and training a first initial model by using the plurality of labeled first training images to generate the first segmentation model, and training a second initial model by using the plurality of labeled second training images to generate the second segmentation model.

* * * * *